United States Patent
Roos et al.

(10) Patent No.: US 9,234,325 B1
(45) Date of Patent: Jan. 12, 2016

(54) COMBINED TURBINE/GENERATOR INSTALLATION ON A DAM

(71) Applicant: American Hydro Jet Corporation, Racine, WI (US)

(72) Inventors: Paul W. Roos, Delray Beach, FL (US); Norman A. Bishop, Naperville, IL (US)

(73) Assignee: AMJET TURBINE SYSTEMS, LLC, Keokuk, IA (US)

( * ) Notice: Subject to any disclaimer, the term of this patent is extended or adjusted under 35 U.S.C. 154(b) by 0 days.

(21) Appl. No.: 14/052,422

(22) Filed: Oct. 11, 2013

Related U.S. Application Data

(60) Provisional application No. 61/713,295, filed on Oct. 12, 2012, provisional application No. 61/768,703, filed on Feb. 25, 2013.

(51) Int. Cl.
 *E02B 9/00* (2006.01)
 *E02B 9/02* (2006.01)

(52) U.S. Cl.
 CPC . *E02B 9/022* (2013.01); *Y02E 10/22* (2013.01)

(58) Field of Classification Search
 CPC ............... Y02E 10/22; Y02E 10/226; E02B 9/022–9/027
 USPC ............................................. 405/78, 99–101
 See application file for complete search history.

(56) References Cited

U.S. PATENT DOCUMENTS

| | | | | |
|---|---|---|---|---|
| 4,488,835 A * | 12/1984 | Eicher | | 405/83 |
| 4,998,846 A * | 3/1991 | Evstratov et al. | | 405/78 |
| 5,825,094 A | 10/1998 | Hess | | |
| 5,864,183 A * | 1/1999 | Fisher et al. | | 290/43 |
| 6,146,096 A | 11/2000 | Winkler | | |
| 6,281,597 B1 | 8/2001 | Obermeyer et al. | | |
| 7,235,894 B2 | 6/2007 | Roos | | |
| 7,372,172 B2 | 5/2008 | Winkler et al. | | |
| 7,385,303 B2 | 6/2008 | Roos | | |
| 8,536,723 B2 | 9/2013 | Roos | | |
| 2007/0041790 A1* | 2/2007 | Cripps | | 405/75 |
| 2008/0143116 A1* | 6/2008 | Obermeyer | | 290/54 |
| 2009/0110485 A1* | 4/2009 | Cripps | | 405/75 |
| 2012/0169054 A1 | 7/2012 | Roos | | |

* cited by examiner

*Primary Examiner* — Tara M. Pinnock
(74) *Attorney, Agent, or Firm* — Jansson Munger McKinley & Kirby Ltd

(57) ABSTRACT

Apparatus for positioning a hydroelectric turbine/generator in a dam having at least two spaced piers, the apparatus comprising (a) at least one first gate each spanning the space between a respective pair of neighboring piers and being movable to closed and open positions and positions therebetween to control flow and maintain head; and (b) at least one second gate, each second gate associated with a corresponding first gate upstream thereof and supporting at least one hydroelectric turbine/generator in a maintenance position and a plurality of operating positions such that in operating positions, water flows through each turbine/generator to produce electric power.

25 Claims, 7 Drawing Sheets

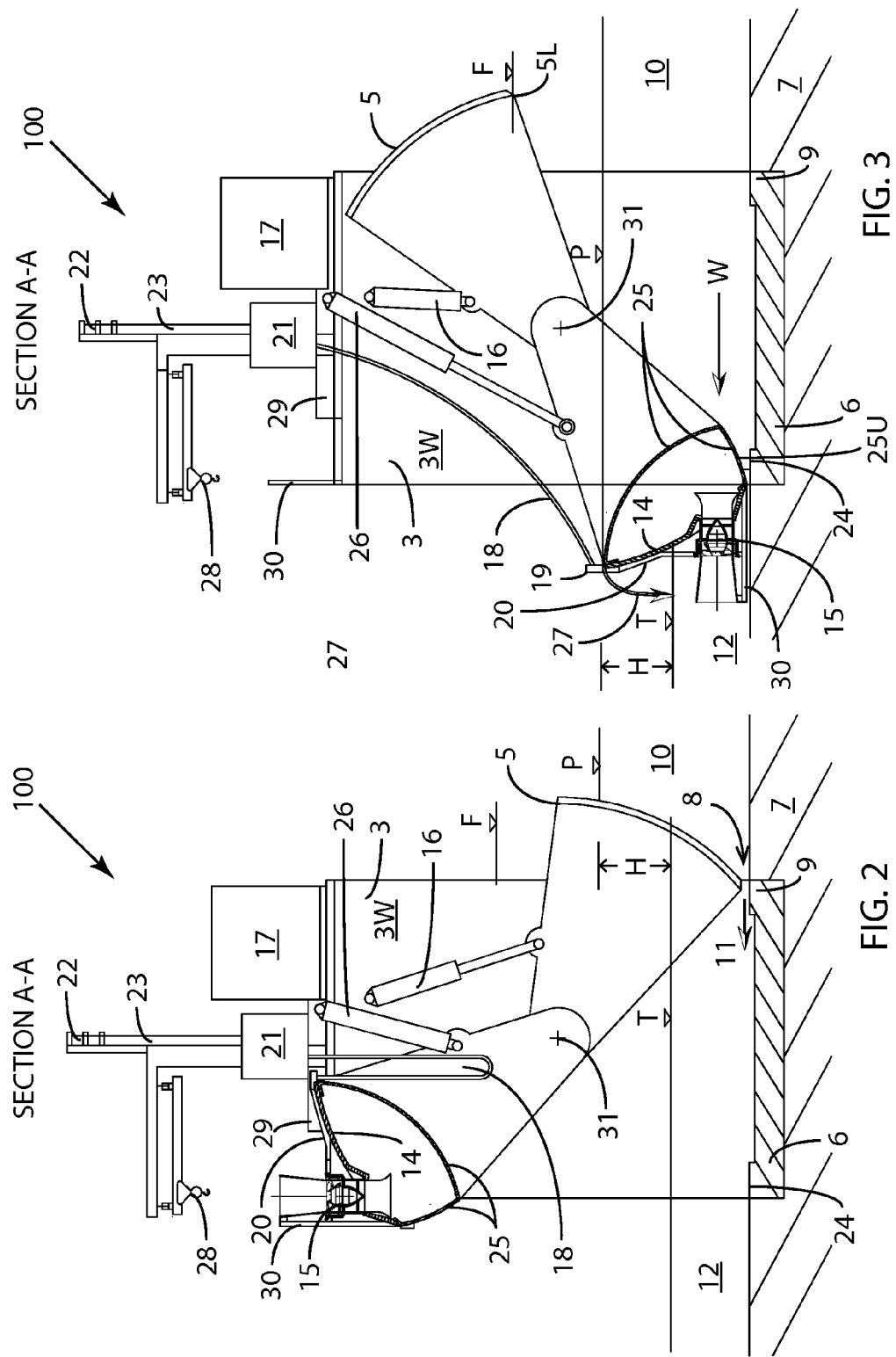

COMBINED TURBINE/GENERATOR INSTALLATION ON A DAM

RELATED APPLICATION

This patent application is related to U.S. Provisional Application No. 61/713,295, filed Oct. 12, 2012 and U.S. Provisional Application No. 61/768,703 filed on Feb. 25, 2013.

FIELD OF THE INVENTION

This invention relates to a low-head hydropower generation, and more specifically to refitting of power generation systems to existing dam structures.

BACKGROUND OF THE INVENTION

The conventional method of adding hydropower generation capability to a non-electrified dam is to remove a portion of the dam and then (1) to build a structure to provide the water conduits to drive conventional turbines, (2) to build a powerhouse to protect the turbines and generators, and (3) to provide a crane to install and service this equipment. It requires drying out the location by means of temporary or cofferdams upstream and downstream of the dam to enable placement of the civil works structure on the bottom of the waterway. A conventional turbine system places an unsightly building on an otherwise low-profile dam structure, and installation is an expensive and time-consuming process.

Other conventional methods involve the use of conventional combined turbine/generators, also called bulb turbines, which are heavy, expensive and less efficient than a newly-developed turbine/generators that weigh much less and install on a bulkhead, thereby avoiding the expense of civil works and cofferdams. This newly-developed turbine is the subject of U.S. Pat. Nos. 7,235,894, 7,385,303, 8,536,723 and U.S. patent application Ser. No. 13/356,288. The system, by virtue of its low weight and small dimensions, allows installation in single or multiple units on a movable gate, thereby allowing for the movable gate to be raised into a maintenance position for the turbine/generator to be serviced or replaced in short order (less than one day), avoiding long-term interruption to power generation.

The mitigation or elimination of some ecological threats created by conventional systems is important in that the present invention makes possible the avoidance of interference with wildlife.

The prior art generally involves systems that are made of steel or bronze and are very heavy. U.S. Pat. No. 5,825,094 discloses a gate structure that is extremely heavy and not practical to build, and using such a gate structure with prior (very heavy) turbines would involve cost which would never be able to be recovered by revenue from electricity generated. Further, such an approach would require an outsized lifting system to raise the gate structure with turbines installed above flood level. Service and maintenance would be extremely difficult since all runners have mechanical drive lines to the generators which use hypoid gear drives. Failure of one of the units stops all other connected turbines, and repair requires the complete unit to be taken out for repair.

Many patents such as U.S. Pat. No. 6,146,096, U.S. Pat. No. 6,281,597 and U.S. Pat. No. 7,372,172 refer to using existing dam gate installations to provide added power generation and the use of multiple self-contained, bulb-type turbine/generators placed in a matrix within a movable gate or pod to provide a low-head hydropower generation system without the need for a powerhouse. Such systems are severely limited by the metallic turbine/generators and fail to address efficiency and variation in flow rate to maintain efficiency. Also, these systems rely on existing crane lifting systems for movement of the turbine matrices. Since heavy metallic turbine/generators require the use of a larger number of smaller units to generate the required level of power, efficiency of the overall system suffers.

U.S. Pat. No. 7,372,172 is characteristic of such an approach whereby a limited number of small metallic turbine/generators are placed in an enclosure, pod or container. This patent discloses a lifting mechanism substantially different for the present invention, and weight of the structures which must be lifted is extremely high.

The present invention incorporates patented and patent-pending low-weight turbine/generators that can be installed in gates and a unique lifting mechanism utilizing rotational movement and capable of spanning the width between piers of a dam agate section. In contrast to the conventional bulb-type matrix turbines, the present invention allows for higher power, larger diameter, low weight turbine/generators to be employed.

In addition, because of the sensitive state (due to age and poor maintenance) of the present dam system in the United States, the modification of an existing non-power-producing dam, however small, creates a concern over the effect of modification such that permission to make changes to add hydropower generation may be denied. The present patent provides a system that does not attach to or alter an existing dam structure in any way while cooperating with the existing dam equipment to provide maximum capacity power generation.

OBJECTS OF THE INVENTION

It is an object of this invention to provide low-cost, highly-efficient power generation for existing and new low-head dams.

Another object is to provide a system which makes use of existing gate construction features to install hydropower generation on a dam.

A further object of this invention is to provide a system which adds power generation capability to an existing dam without modifying or altering the existing dam in any way.

Another object is to provide a system which avoids the building of a powerhouse on a previously non-powered dam.

It is a further object to use the existing structure to provide support for a downstream gate which carries at least one turbine/generator.

Yet another object is to enable the simultaneous use of the hinge support of an existing dam gate structure for a downstream gate carrying at least one turbine/generator without interfering with the original gate structure and its operation.

Another object is to enable the use of dual parallel arms to move at least one gate with a turbine/generator installed in a substantially vertical direction and to allow controlled flow underneath the gate.

Another object is to enable the use of dual gates, whereby an upstream gate operates as a controlled flow device for one or more turbine/generators installed on a downstream gate.

It is a further object of this invention to provide trash and fish passage prevention through a turbine/generator.

Another object is to provide the thrash and fish passage prevention system to be self-cleaning.

Another object is to reduce the lifting load required during the raising of a gate having turbine/generators installed therein.

Another object is to provide a maintenance position, overhaul and replacement of the turbine/generators installed in a retrofit power generation system for a dam.

These and other objects of the invention will be apparent from the following descriptions and from the drawings.

DEFINITIONS

The term "head" as used herein refers to the height differential between the upstream water level and the downstream water level of the dam, typically measured in feet or meters.

The term "low-head dam" as used herein refers to a dam with a head of less than 50 feet or 15 meters.

The term "conventional turbine" as used herein refers to a separate turbine and generator connected by a drive shaft and requiring a foundation with water passages to accommodate the turbine operation.

The term "turbine/generator" as used herein refers to a combination of a turbine and generator in a common housing.

The term "second gate" as used herein refers to a gate placed downstream of a first gate, the first gate being the upstream gate controlling the head of a dam. The second gate carries the turbine/generators and maintains the head while the turbine/generators produce electric power with the first gate open.

SUMMARY OF THE INVENTION

The present invention is apparatus for positioning at least one hydroelectric turbine/generator in a dam having at least two spaced piers. The apparatus comprises (a) at least one first gate each spanning the space between a respective pair of neighboring piers and being movable to closed and open positions and positions therebetween to control flow and maintain head and (2) at least one second gate, each second gate associated with a corresponding first gate upstream thereof and supporting at least one hydroelectric turbine/generator in a maintenance position and a plurality of operating positions such that in operating positions, water flows through each turbine/generator to produce electric power.

In certain embodiments, the apparatus further includes at least one first-gate controller configured to control one or more first gates to control flow rate through the at least one turbine/generator in the corresponding one or more second gates.

In some embodiments, the apparatus further includes at least one second-gate controller configured to control second-gate operating position to control water passage therebelow.

In certain embodiments, the apparatus of claim 1 whereby the at least one first gate is positioned in the closed position, thereby eliminating flow through the at least one turbine/generator and permitting the raising of the corresponding at least one second gate.

Also in some embodiments, at least one of the first and second gates is rotated into position by means of arms fixed to the gate and supported by pivots in pier walls. In some of these embodiments, each of the at least one second gates rotates about the pivots of its corresponding first gate, and in some embodiments, the pivots are above tailwater level.

In certain preferred embodiments of the apparatus, at least one of the first and second gates is raised and lowered by sliding or rolling in a substantially vertical direction by tracks in or on the pier walls.

In certain embodiments, at least one of the first and second gates is moved in a substantially vertical direction supported by parallel control bars pivoted on the pier walls. In some such embodiments, the at least one second has parallel control bars.

In certain preferred embodiments of the apparatus, the top of the at least one second gate in an operating position is at a head level of the dam and the at least one corresponding first gate is in an open position, thereby allowing the head to drive the at least one turbine/generator while allowing flow over the top of the at least one second gate in the operating position.

In certain embodiments of the inventive apparatus, the at least one second gate can be raised to the maintenance position to allow service and replacement access to the at least one turbine/generator. In some of these embodiments, the at least one second gate in the maintenance position places the at least one turbine/generator in a vertical-axis position.

In some preferred embodiments of the apparatus, the at least one second gate has a screen placed such that it prevents trash and fish from passing through the at least one turbine/generator, and in some such embodiments, the screen is cleaned by raising the second gate to rotate the screen to cause debris to fall away. In other such embodiments, the screen is equipped with piping and nozzles to remove debris from the screen with pressurized fluid. Further, in some embodiments, the screen is placed such that flow through the screen diminishes toward the head-water surface, such diminished water flow lowering the force of impingement of debris on the screen and promoting movement of debris over the at least one second gate.

In highly-preferred embodiments of the inventive apparatus, the at least one second gate is supported independently of the two corresponding spaced piers. In some of these embodiments, the at least one second gate is supported by at least two pylons placed adjacent to the two corresponding spaced piers. In some such embodiments, the pylons support a sill to provide shut-off for the at least one corresponding second gate in a closed position. In some embodiments, each pair of spaced piers includes a service platform supported by the pylons. In some embodiments, the apparatus further includes at least one lifting mechanism for movement of a corresponding second gate, the lifting mechanism supported by pylons.

In certain preferred embodiments, the inventive apparatus further includes at least one barrier adjacent to each spaced pier and supported by pylons.

In some preferred embodiments, the apparatus includes at least one barrier placed adjacent to each spaced piers such that all water flowing between two spaced piers flows to the corresponding second gate.

BRIEF DESCRIPTION OF THE DRAWINGS

In FIG. 1, the inventive apparatus is in an operating position.

FIG. 2 is a section through the dam of FIG. 1 with common pivot Tainter gates and the turbine/generator units in a maintenance position. (Section A-A as shown herein are so labeled even when the position of the apparatus is changed.)

FIG. 3 is a section through the dam of FIG. 1 with common pivot Tainter gates and the units in an operating position.

DETAILED DESCRIPTION OF PREFERRED EMBODIMENTS

Preferred embodiments of the present invention are depicted in FIGS. 1-12. The inventive concept centers around using existing dam elements, namely the headwater level control/flood gates present in the major American rivers and rivers worldwide, to generate electric power. These gates double as shut-off gates for turbine/generators placed downstream of such gates and are necessary components in this invention. Such gates are referred to as "first gates."

Most existing dam systems consist of a combination of a solid concrete or earthen dam and an array of piers stretched across the river. The piers support first gates lowered into the stream that restrict flow downstream and cause higher water levels upstream. These first gates may be raised and lowered to provide control of the restriction, permitting water to rise to a controlled level, allowing flow underneath the first gates and maintaining a head by raising the water level upstream of the dam. This provides flood control and deeper shipping channels. These dams are often provided with locks to allow shipping to bypass the dam.

Figure 1:
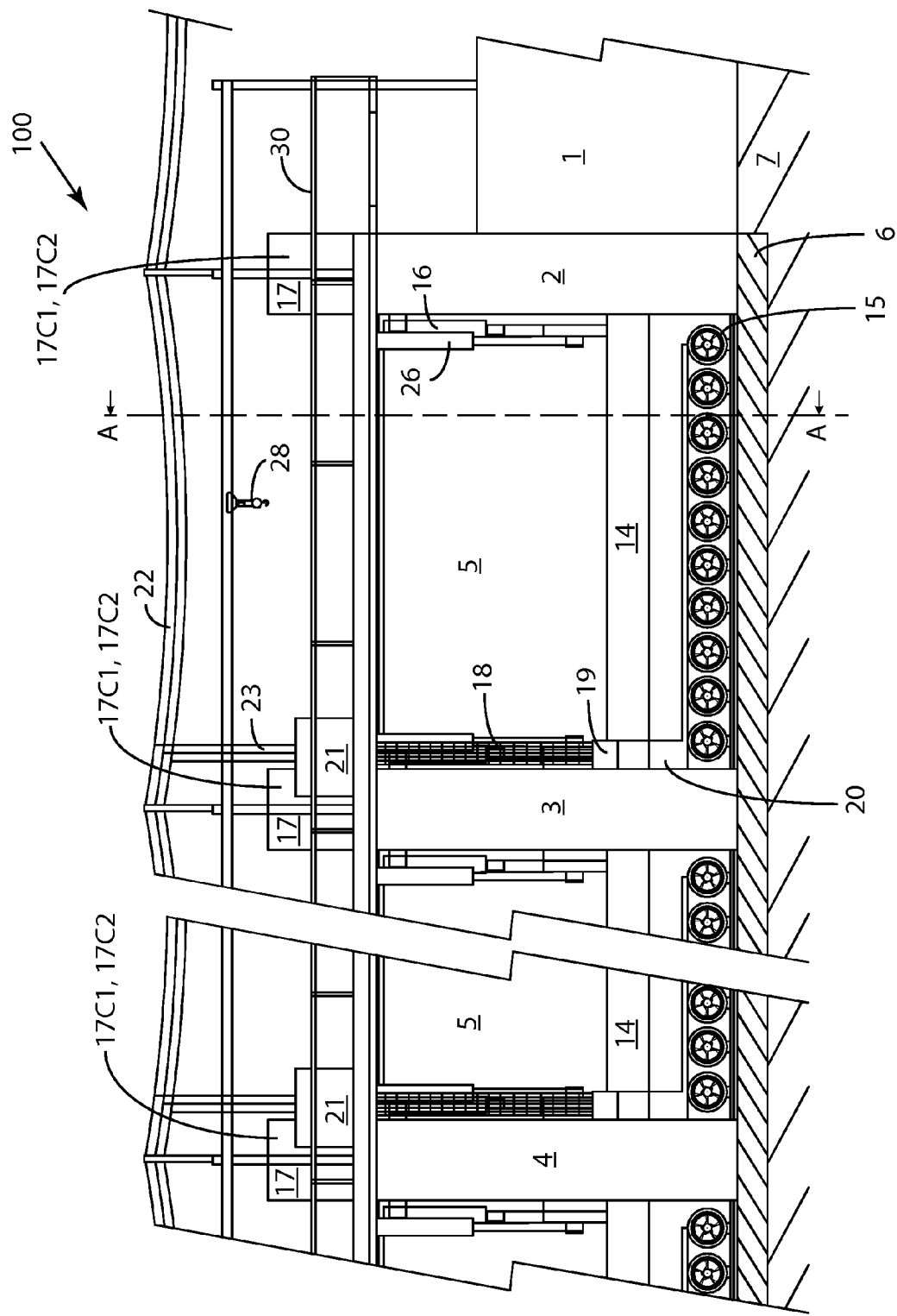
FIG. 1 is an elevation of a dam looking upstream from the downstream side and including an embodiment of the inventive apparatus retrofitted thereto.

FIG. 1 depicts such a dam system looking upstream from the downstream side and having an embodiment 100 of the inventive apparatus installed thereon. On the right on FIG. 1 is a solid dam 1 and adjacent to it is a pier 2. Further to the left are piers 3, 4, etc. First gates 5 are suspended between piers 2 and 3 and piers 3 and 4, etc. and are shown in a raised position. (In the embodiment of FIGS. 1-3, first gates 5 are Tainter gates.) A set of second gates 14 carry ten turbine/generators 15 (in this embodiment) to maintain the water level P of the dam while allowing water to pass through turbine/generators 15. Piers 2, 3, 4, etc. are supported by a concrete base 6 set in the river-bottom bedrock 7.

FIG. 2 shows section A-A of dam 1 in elevation cross-section with second gate 14 in a maintenance position. First gate 5 has controllable elevation and can be lowered to seat on a sill 9 thereby shutting off all water flow. FIG. 2 shows first gate 5 in an almost-closed position. It allows water passage by varying the size of a gap 8 and thus the rate of water flow 11 and so can control water level P of the upstream pool 10 by means of controllers 17C2. The head H is the height difference between water level P and a water level T of tailwater 12. First gate 5 is raised and lowered by hydraulic cylinders 16 operated by a hydraulic pump and valve system 17. Multiple first gates 5 may be suspended between piers 3 and 4 and between 4 and subsequent piers providing multiple gate arrangements across the river, as is understood by those versed in the art of dam construction.

Second gates 14 are also raised and lowered by hydraulic cylinders 26 and operate in conjunction with first gates 5. In order to take turbine/generators 15 out of the water flow and move them to a maintenance position, first gate 5 must be closed to stop water flow through turbine/generators 15. Then, second gate 14 can be raised to place turbine/generators 15 in the maintenance position as shown in FIG. 2. First gate 5 is in a raised position allowing headwater 10 to extend to second gate 14.

As shown in FIG. 3, second gate 14 is in an operating position (power-generating position) and first gate 5 is in an open position. The lower edge 5L of gate 5, in a raised position, is at least the height of the flood level F to ensure the water passage at the flood stage. Second gate 14 is sized to maintain level P of headwater 10 and seats on downstream sill 24. Power is generated as a result of water flow W caused by head H between headwater 10 and tailwater 12. The power is transmitted via cables 18, a junction box 19 and a cable tray 20 to a power conditioner 21. Power conditioner 21 converts the power generated by turbine/generators 15 to match the power grid 22 and is transported thereto via wires 23.

First gates 5, controlled by controllers 17C1, and second gates 14 may advantageously pivot around common pivot 31 advantageously placed above tailwater level T to allow installation of pivot 31 from a barge (not shown) and to avoid water submersion. Pivot 31 is attached to pier wall 3W of pier 3.

Figure 10:
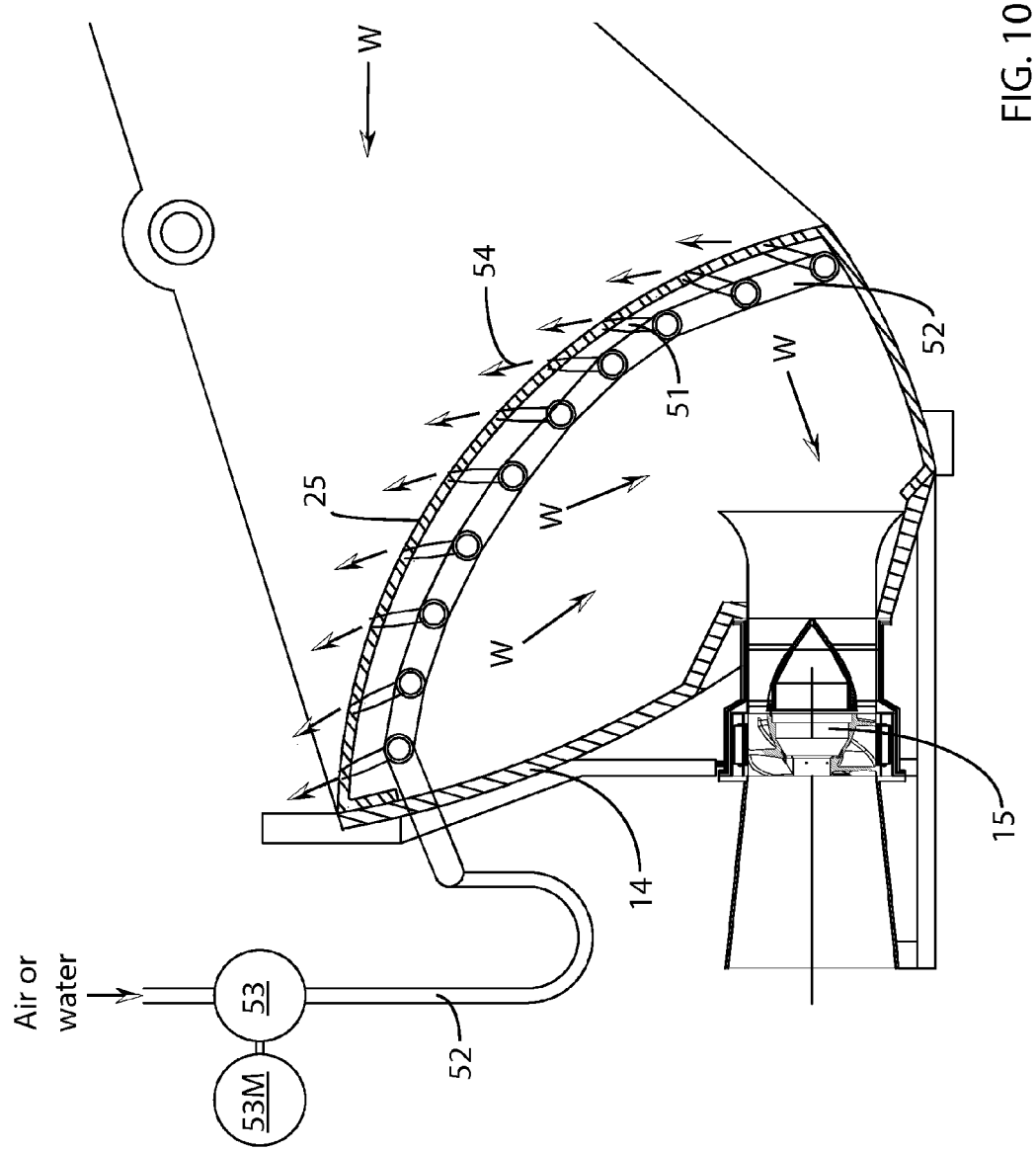
FIG. 10 is a detail section of a second gate in an embodiment of the inventive apparatus having an inventive air- or water-jet screen-cleaning system.

Second gate 14 is provided with a trash screen 25 to prevent fish and debris from passing through turbine/generators 15 and is shaped to deflect debris. As water flows over trash screen 25, the water flow will drive debris over the top of second gate 14 and deposit it in tailwater 12 via flow 27 flowing over second gate 14. Heavier debris deflected downward toward an under portion 25U of trash screen 25 will accumulate until second gate 14 is raised and then will pass into tailwater 12 across downstream sill 24. When second gate 14 is in a raised position, it places turbine/generators 15 in a position for maintenance or replacement (as shown in FIG. 2) utilizing a platform 29, a railing 30 and an overhead crane 28. FIG. 10 later in this document illustrates an alternative embodiment for moving debris from trash screen 25.

Figure 4:
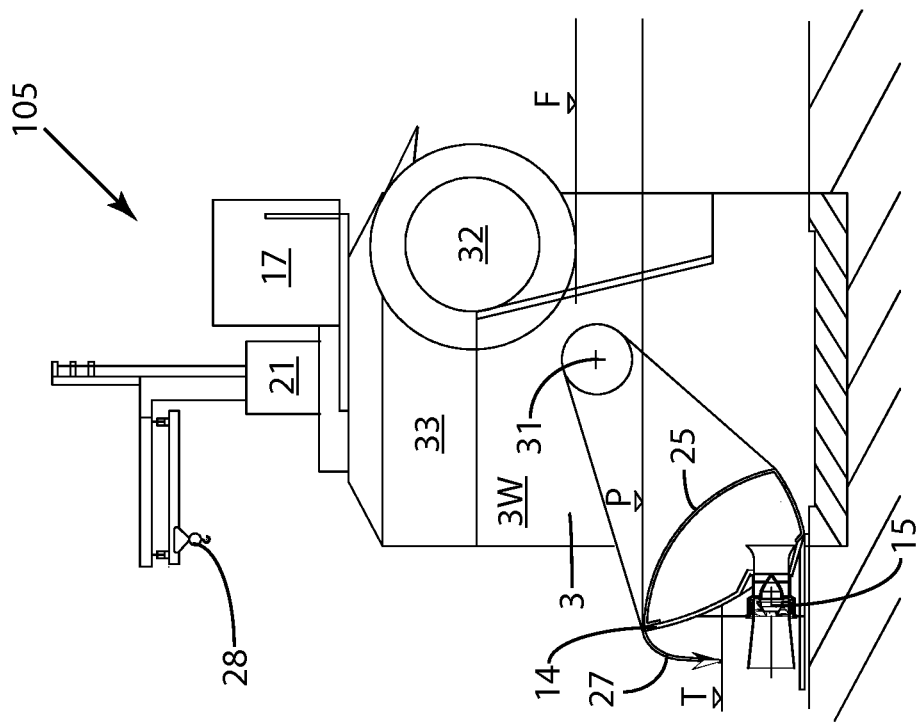
FIG. 4 is a section of a dam with a roller-gate alternative embodiment of the inventive apparatus in a maintenance position.
Figure 5:
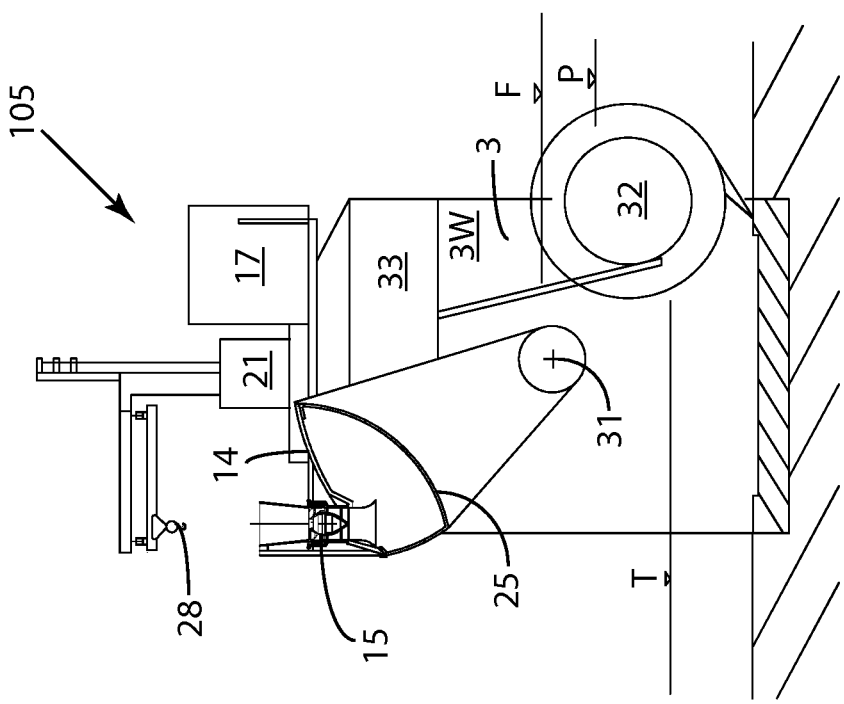
FIG. 5 is a section of the dam of FIG. 4 with the inventive apparatus in an operating position.

FIGS. 4 and 5 illustrate an alternative embodiment 105 having a roller gate 32 as its first gate. First gate 32 is operated by a mechanical drive 33. Second gate 14 is identical to that shown in FIGS. 1-3. FIG. 4 illustrates second gate 14 in a maintenance position while FIG. 5 illustrates second gate 14 in an operating position.

Figure 7:
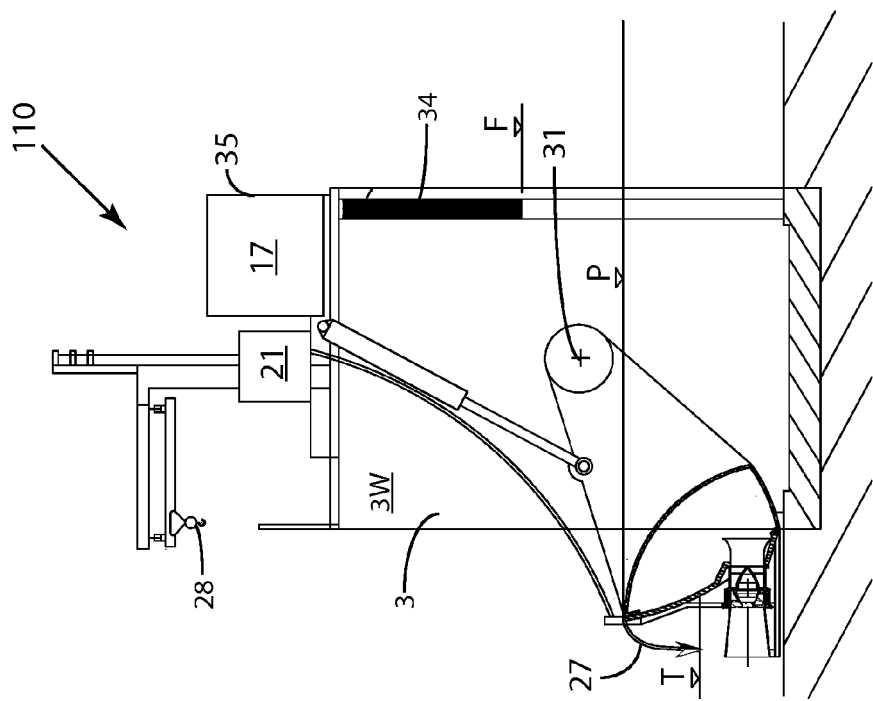
FIG. 7 is a section of the dam of FIG. 6 with the inventive apparatus in an operating position.
Figure 6:
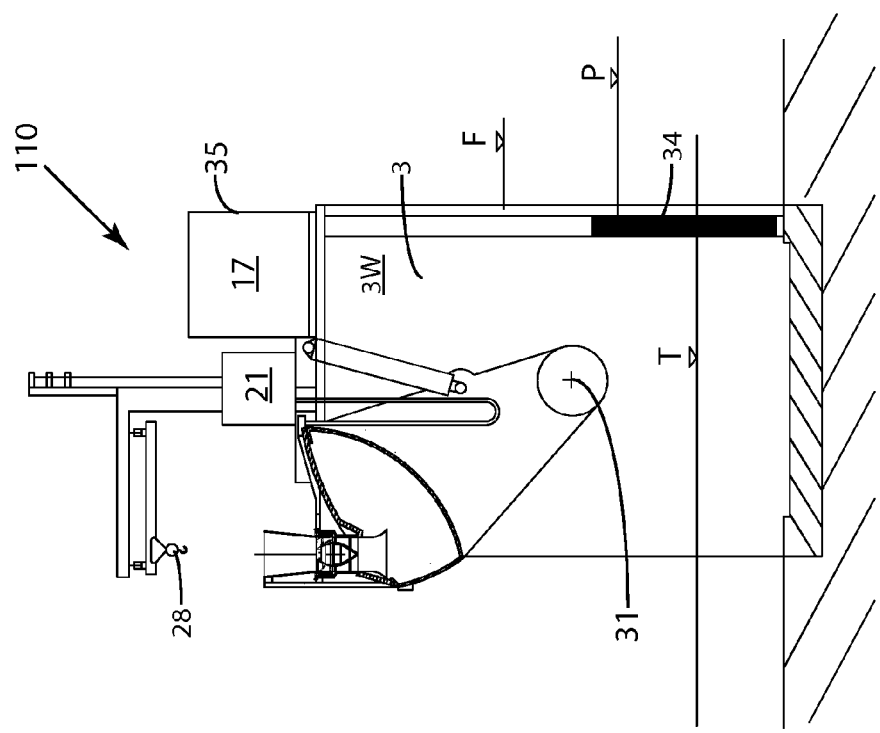
FIG. 6 is a section of a dam with a sliding-gate alternative embodiment of the inventive apparatus in a maintenance position.

FIGS. 6 and 7 illustrate another alternative embodiment 110 having a sliding gate 34 as a first gate operated by machinery 35. Second gate 14 is again identical to that shown in FIGS. 1-3. FIG. 6 illustrates second gate 14 in a maintenance position while FIG. 7 illustrates second gate 14 in an operating position.

Figure 9:
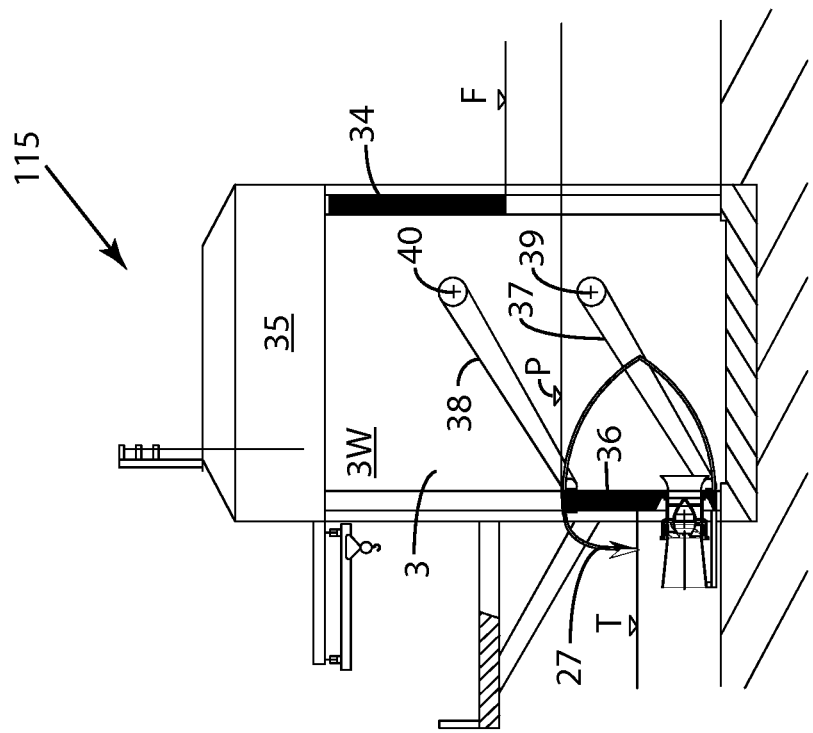
FIG. 9 is a section of the dam of FIG. 8 with the inventive apparatus in an operating position.
Figure 8:
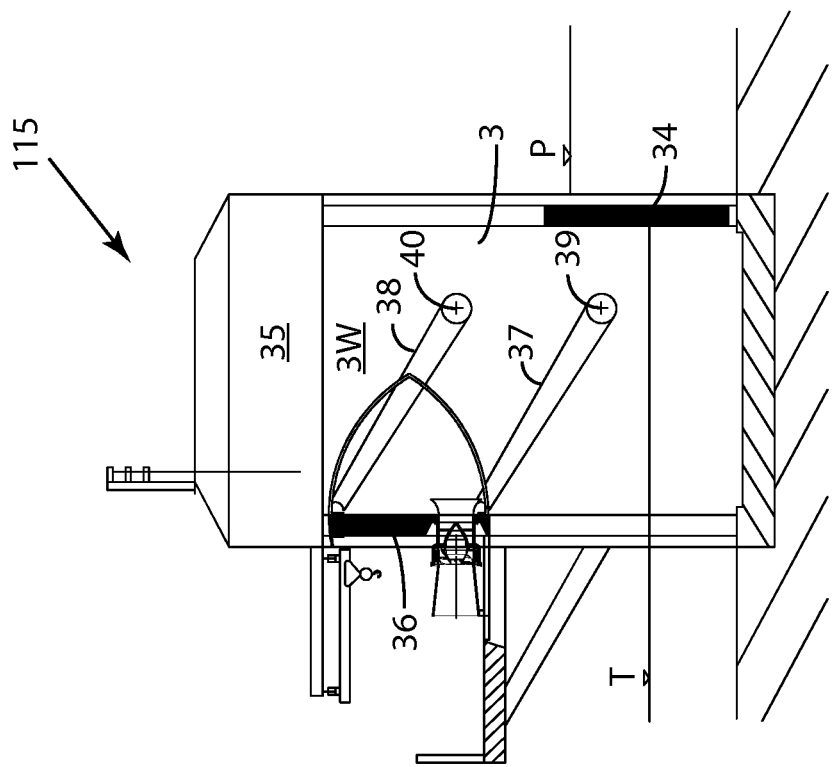
FIG. 8 is a section of a dam with a parallel-bar embodiment of the inventive apparatus in a maintenance position.

FIGS. 8 and 9 illustrate an alternative embodiment 115 having a second gate 36 placed in a dam having sliding gate 34 as a first gate. First gate 34 is operated by machinery 35. Second gate 36 movement is controlled by a pair of parallel control arms 37 and 38. The location of the pivots 39 and 40 in pier walls 3W is above tailwater level T to enable installation without the need for drying out the area around first gate 34 and second gate 36 with the use of a cofferdam.

In the embodiments FIGS. 2, 4 and 6, with trash screen 25 in a raised position on second gate 14 debris, will drop off into tailwater 12. FIG. 10 illustrates an enhanced approach to removing debris from trash screen 25. FIG. 10 shows a detail of trash screen 25 with a set of nozzles 51 installed, fed by a pump 53 (driven by a motor 53M) with air or water via a piping system 52 installed behind trash screen 25. Nozzles 51 direct water to flow in upward direction 54 carrying debris otherwise stuck on trash screen 25 over the top of second gate 14. This system works also in the raised position of second gate 14, ejecting debris from trash screen 25 into tailwater 12.

Figure 11:
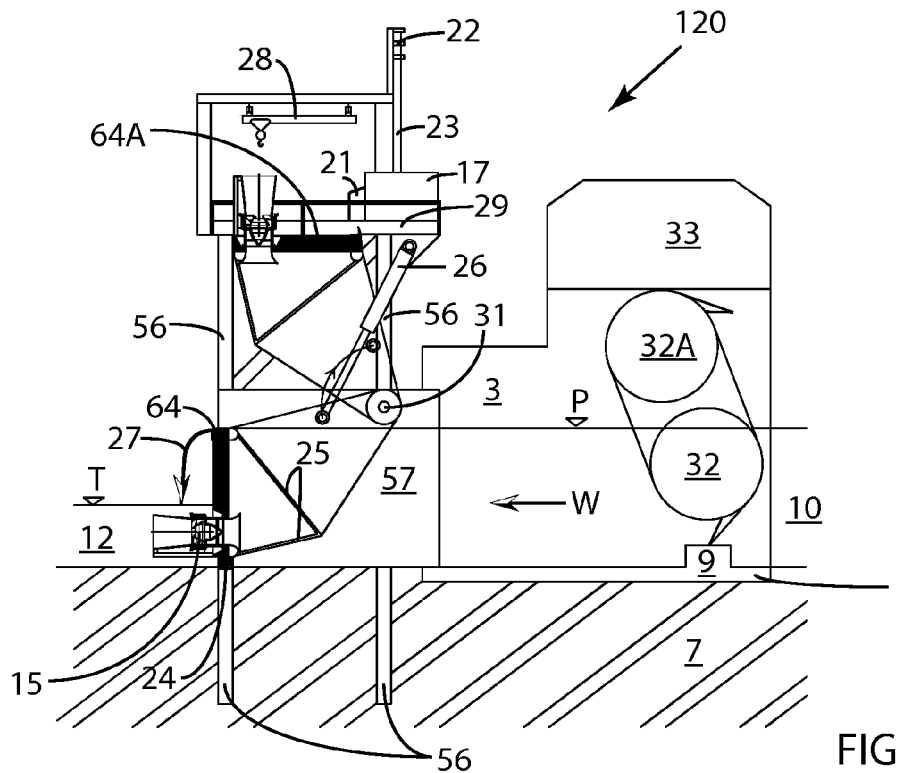
FIG. 11 is a section of a dam with an embodiment of the inventive apparatus placed adjacent to and independent of the existing dam structure.
Figure 12:
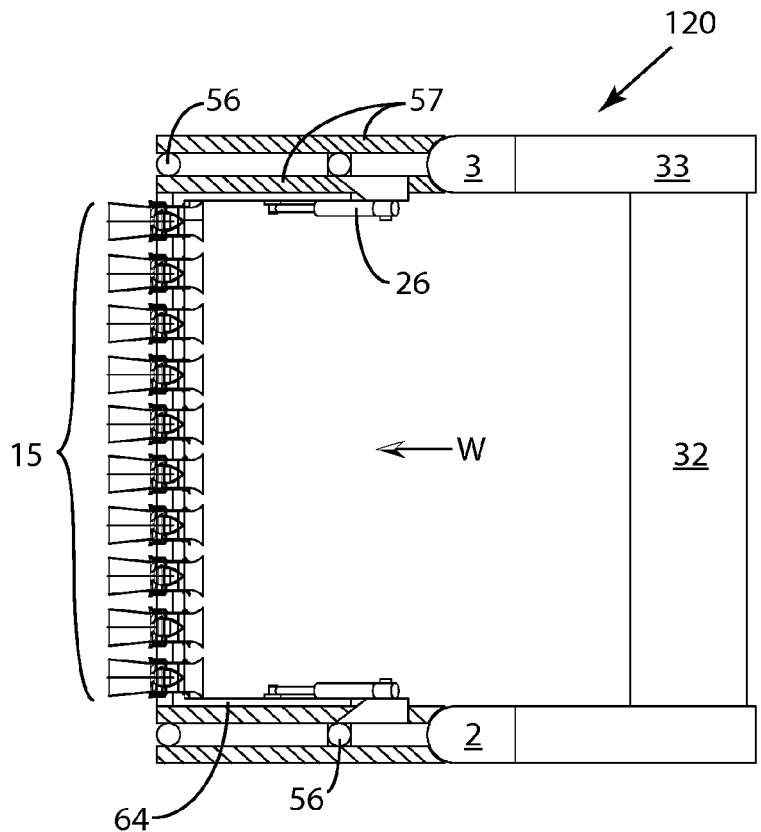
FIG. 12 is a plan view of the dam section of FIG. 11.

FIGS. 11 and 12 illustrate another alternative embodiment 120 but one that is not mechanically connected to piers 2, 3, 4 etc. Rather, embodiment 120 is placed adjacent to and downstream of piers 2 and 3 of an existing dam and uses first gate 32 of the dam to provide shut-off for second gate 64. Second gate 64 and other apparatus (17, 21, 22, 23, 25, 26, 28, 29 and 31 as shown) are supported by two or more pylons 56 bored into the bedrock 7 downstream of and in-line with piers 2, 3, 4, etc., and such support is independent of piers 2, 3, 4 etc.

Drilling into bedrock 7 to place pylons 56 is done from a barge (not shown) and does not require a cofferdam. Pylons 56 support a structure that contains hinge points 31 for second gate 64 and hydraulic cylinder 26 to raise second gate 64. Barriers 57 are attached to pylons 56 to maintain the water flow W to second gate 64 by preventing water flow W from by-passing second gate 64. Pylons 56 also support sill 24.

Pylons 56 further support service platform 29 that provides access to turbine/generators 15 for maintenance or replacement. Service platform 29 also supports overhead crane 28 to transport components to shore. First gate 32 (roller gate) is shown in its closed position in FIG. 11. First gate 32 is shown in a raised position 32A when second gate 64 is in an operating position (down position). FIG. 11 shows second gate 64 in its raised maintenance position 64A. FIG. 12 shows a plan view of embodiment 120 but shows only piers 2 and 3 without adjacent structure.

While the principles of this invention have been described in connection with specific embodiments, it should be understood clearly that these descriptions are made only by way of example and are not intended to limit the scope of the invention. For example, hydraulic actuators are shown as part of the embodiments herein, but such actuators are in no way intended to be limiting; several other configurations for moving structures within the inventive apparatus, such as cables and drums, are possible.

The invention claimed is:

1. Apparatus for positioning at least one hydroelectric turbine/generator in a dam, the dam having at least two spaced piers, the apparatus comprising:
at least one first gate, each first gate configured to span the space between a respective pair of neighboring piers and being movable to closed and open positions and positions therebetween to control flow and maintain head; and
at least one second gate, each second gate associated with a corresponding first gate upstream thereof and supporting at least one hydroelectric turbine/generator in a maintenance position and a plurality of operating positions such that in operating positions, water flows through each turbine/generator to produce electric power, the at least one first gate being configured such that when in the closed position, flow through the at least one turbine/generator is eliminated, thereby permitting the raising of the corresponding at least one second gate.

2. The apparatus of claim 1 further including at least one first-gate controller configured to control one or more of the at least one first gate to control flow rate through the at least one turbine/generator in the corresponding one or more of the at least one second gate.

3. The apparatus of claim 1 further including at least one second-gate controller configured to control second-gate operating position, thereby controlling water passage therebelow.

4. The apparatus of claim 1 whereby one or more of the at least one first gate is rotated into position by means of arms fixed to the corresponding first gate and supported by pivots in corresponding pier walls.

5. The apparatus of claim 4 wherein, for each first gate having pivots, the corresponding second gate rotates about the pivots of its corresponding first gate.

6. The apparatus of claim 4 wherein the pivots are above tailwater level.

7. The apparatus of claim 1 whereby at least one of the first and second gates is raised and lowered by sliding or rolling in a substantially vertical direction by tracks in or on pier walls.

8. The apparatus of claim 1 whereby at least one of the first and second gates is moved in a substantially vertical direction supported by parallel control bars pivoted on pier walls.

9. The apparatus of claim 8 whereby the at least one second gate has parallel control bars.

10. The apparatus of claim 1 whereby the top of the at least one second gate in an operating position is at a head level of the dam and the at least one corresponding first gate is in an open position, thereby allowing the head to drive the at least one turbine/generator while allowing flow over the top of the at least one second gate in the operating position.

11. The apparatus of claim 1 whereby the at least one second gate can be raised to the maintenance position, thereby allowing service and replacement access to the at least one turbine/generator.

12. The apparatus of claim 11 whereby the at least one second gate in the maintenance position places the at least one turbine/generator in a vertical-axis position.

13. The apparatus of claim 1 whereby the at least one second gate has a screen placed such that it prevents trash and fish from passing through the at least one turbine/generator.

14. The apparatus of claim 13 whereby the screen is cleaned by raising the second gate to rotate the screen to cause debris to fall away.

15. The apparatus of claim 13 whereby the screen is equipped with piping and nozzles to remove debris from the screen with pressurized fluid.

16. The apparatus of claim 13 whereby the screen is placed such that flow through the screen diminishes toward the headwater surface, such diminished water flow lowering the force of impingement of debris on the screen and promoting movement of debris over the at least one second gate.

17. The apparatus of claim 1 whereby the at least one second gate is supported independently of the respective pair of neighboring spaced piers.

18. The apparatus of claim 17 whereby the at least one second gate is supported by at least two pylons for placement adjacent to the respective pair of neighboring spaced piers.

19. The apparatus of claim 18 whereby the pylons support a sill to provide shut-off for the at least one corresponding second gate in a closed position.

20. The apparatus of claim 18 further including a service platform supported by the pylons.

21. The apparatus of claim 18 further including at least one lifting mechanism for movement of a corresponding second gate, the lifting mechanism supported by pylons.

22. The apparatus of claim 1 further including at least one barrier adjacent to each pier of the respective pair of neighboring spaced piers and supported by pylons.

23. The apparatus of claim 1 including at least one barrier placed adjacent to each pier of the respective pair of neighboring spaced piers such that all water flowing between two spaced piers flows to the corresponding second gate.

24. The apparatus of claim 1 whereby one or more of the at least one second gate is rotated into position by means of arms fixed to the corresponding second gate and supported by pivots in walls of the respective pair of neighboring spaced piers.

25. The apparatus of claim 24 wherein the pivots are above tailwater level.

\* \* \* \* \*